UNITED STATES PATENT OFFICE 2,673,210

TRIORGANOSILYLPHENYLENE PHOSPHORUS DERIVATIVES

Kurt C. Frisch, Huntington Valley, and Harold Lyons, Philadelphia, Pa., assignors to General Electric Company, a corporation of New York No Drawing. Application April 6, 1953, Serial No. 347,166

5 Claims. (Cl. 260—448.2)

This invention is concerned with novel triorganosilylphenylene phosphorus derivatives. More particularly, the invention relates to triorganosilylphenylene phosphorus derivatives selected from the class consisting of triorganosilylphenylene phosphine oxides, triorganosilylphenylene phosphoric acids, triorganosilylphenylene phosphines and triorganosilylphenylene chlorophosphines.

The particular triorganosilylphenylene derivatives falling within the scope of the present invention may be considered as having the following formulae:

I 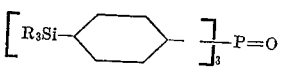

II 

III 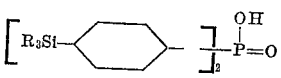

and

IV 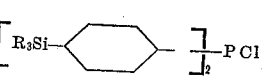

In the above formulae, R may stand for various organic radicals particularly monovalent hydrocarbon radicals as, for instance, alkyl radicals (e. g., methyl, ethyl, propyl, isopropyl, butyl, decyl, etc.), aryl radicals (e. g., phenyl, naphthyl, biphenyl, etc.), aralkyl radicals (e. g., benzyl, phenylethyl, etc.), alkaryl radicals (e. g., tolyl, xylyl, ethylphenyl, etc.), cycloaliphatic (e. g., cyclohexane, cyclopentane, cyclohexene, etc.), as well as monovalent hydrocarbon radicals containing substituents thereon which are inert, for instance, halogens, such as chlorine, bromine, fluorine, etc.

The compositions herein described are valuable chemical intermediates in the preparation of various silicon-containing materials including salts, esters, etc., which could conveniently be used as anti-foaming agents, chemical intermediates, ion exchange resins, etc. The compositions herein described are also useful as flame-proofing compositions for phenolic resins, epoxy resins, etc. (when used in laminating or molding applications as arc chute materials, etc.), as additives for various lubricants, as plasticizers, etc. Various organopolysiloxanes may be modified by the inclusion of the triorganosilylphenylene phosphorus derivatives to impart thereto improved properties as, for instance, improved tear resistance of silicone rubbers, increased flame resistance in silicone resins, improved lubricity properties in silicone oils, etc.

Various methods may be employed for preparing the compositions herein described. Thus, one may start with a triorganosilylphenylmagnesium bromide of the formula V 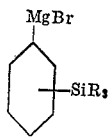

where R has the meaning given above and this Grignard reagent may be permitted to react with, for instance, POCl₃ or PC, in the required molar concentration, either alone or in the presence of catalysts useful in such reactions, for instance, Friedel-Crafts catalysts, such as aluminum trichloride, etc., to give the triorganosilylphenylene phosphorus derivatives described above. Taking as an example a Grignard reagent such as p-trimethylsilylphenylmagnesium bromide of the formula VI 

one may react the latter with, for instance, POCl₃ or PCl₃ in accordance with the following equations to give the recited chemical compositions:

VII 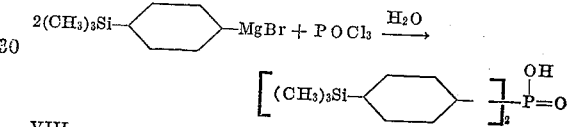

VIII 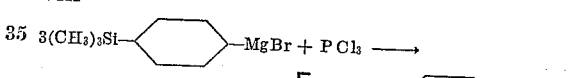

IX 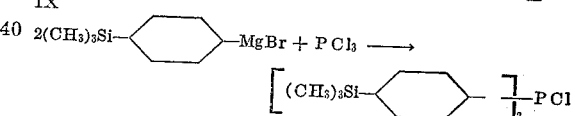

The by-products produced as a result of the reaction between the Grignard reagent and the phosphorus derivative are not given in the above equations. Obviously, the compounds produced in accordance with the above-described Equations VII to IX can undergo reactions characteristic of various phosphorus or silicon compounds. Thus, the phosphines can be oxidized to phosphine oxides, or halogens can be added to the phosphines to yield phosphonyl halides, which can then be hydrolyzed to give the corresponding acids, etc.

In preparing the Grignard reagents used in the practice of the present invention, the usual procedure is to form a mixture of ingredients comprising magnesium turnings, and a halogenophenyltriorganosilane, for instance, para-bromophenyltrimethylsilane in diethyl ether, initiating the reaction preferably by a small amount of ethyl magnesium bromide. Thereafter, this Grignard reagent (or any other Grignard reagent required for the preparation of specific compound desired) is added slowly to the phosphoryl halide, for instance, phosphorus trichloride or phosphorus oxychloride (POCl₃) advantageously dissolved in an aliphatic ether. After the addition of the ingredients, the reaction mixture is advantageously heated at the reflux temperature of the mass, and thereafter the reaction product further processed by suitable means, e. g., fractional distillation, recrystallization, etc. to recover the desired product.

In order that those skilled in the art may better understand how the present invention may be practiced, the following examples are given by way of illustration and not by way of limitation. All parts are by weight.

Example 1

Para-trimethylsilylphenyl magnesium bromide (identified as "Grignard solution") was prepared by intimately mixing together in the usual fashion 12.2 parts of magnesium turnings, 114.5 parts p-bromophenyltrimethylsilane, and about 390 parts diethyl ether using a small amount of ethylmagnesium bromide to initiate the reaction.

In the three-necked flask equipped with stirrer, reflux condenser and dropping funnel, was placed 34.4 parts PCl₃ and 71 parts diethyl ether. Half of the above-prepared Grignard solution was added gradually through the dropping funnel and the reaction mixture was thereafter heated for an additional three hours at the reflux temperature of the mass. The formed precipitate was removed by filtration, washed with ether, the washings combined with the filtrate, and the diethyl ether solvent removed to give a solid material, which when recrystallized from ethyl alcohol yielded a mass of colorless needles melting at around 95–96° C. and boiling at about 112–117° C. at 31 mm. This compound was identified as tris-(p-tri-methylsilylphenyl) phosphine having the formula.

X  

as evidenced by the fact that analysis of this compound showed it to contain about 17.24 per cent silicon and 6.77 per cent phosphorus (theoretical 17.57 per cent silicon and 6.48 per cent phosphorus). Another fraction isolated during the distillation of the above product distilled in the form of a colorless liquid at around 72° C. at 43 mm. Analysis of this compound showed it to comprise bis-(p-trimethylsilylphenyl) chlorophosphine having the formula X  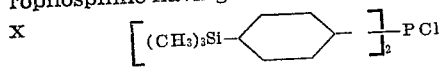

Example 2

Tris-(p-trimethylsilylphenyl) phosphine oxide having the formula

XI  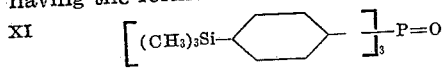

was prepared by forming a Grignard reagent comprising para-trimethylsilylphenyl magnesium bromide similarly as was done in Example 1 above and adding half of this Grignard reagent to a solution of 38 parts POCl₃ in about 213 parts diethyl ether using the same apparatus described above in Example 1. The mixture of ingredients was thereafter heated at the reflux temperature of the mass for about 15 hours, and after cooling the yellow liquid which separated out was decanted from the residual solid. The solid isolated portion was hydrolyzed by pouring it into ice water to form a white precipitate. The latter precipitate was combined with the residual solid obtained by concentrating on a steam bath the yellow liquid which had been removed by decantation, washed first with dilute sodium hydroxide solution, thereafter with water, and finally extracted with diethyl ether. The ether extract was dried over anhydrous sodium sulphate, the ether removed, and the remaining solid material was recrystallized from ethyl alcohol to yield a colorless crystalline product melting at about 259° C. This was identified as tris-(p-trimethylsilylphenyl) phosphine oxide as evidenced by the fact that analysis thereof showed it to contain 17.38 per cent silicon and 6.8 per cent phosphorus (theoretical 17.0 per cent silicon and 6.3 per cent phosphorus).

The above-mentioned sodium hydroxide extract from the combined solid products from the reaction of para-trimethylsilylphenyl magnesium bromide and POCl₃ described in Example 2 was acidified with dilute hydrochloric acid to yield a colorless crystalline product having a melting point of 213–214.5° C. This compound was identified as being bis-(p-trimethylsilylphenyl) phosphonic acid having the formula

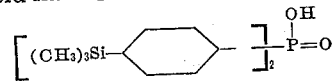

as evidenced by the fact that analysis thereof showed it to contain 16.5 per cent silicon (theoretical 15.5 per cent silicon).

It will, of course, be apparent to those skilled in the art that in addition to making the trimethylsilylphenylene phosphorus derivatives described in the foregoing examples, other triorganosilylphenylene phosphorus derivatives may also be prepared by employing in place of the para-trimethylsilylphenylene bromide used in the foregoing examples, other triorganosilylphenyl magnesium bromide. Thus, the triphenylsilylphenylene phosphorus analogues of the trimethylsilylphenylene phosphorus derivatives may be prepared by employing as the Grignard reagent in the above described reactions, para-triphenylsilylphenyl magnesium bromide, and carrying out the same reactions as described above.

If desired, compositions containing silicon-bonded hydrolyzable groups may also be obtained by employing in the preparation of the Grignard reagent such compounds as, for instance, alkoxy diorganosilylphenyl magnesium bromide for reaction with the PCl₃ or the POCl₃, as the case may be. In this way, it may be possible to hydrolyze the final phosphorus derivative to give siloxane reaction products which may have eminent use as oils, rubbers, resins, either by themselves or as modifying agents for the aforesaid silicone oils, resins and rubbers.

It will, of course, be apparent to those skilled in the art that the triorganosilyl group may be attached to other points of the phenyl nucleus, for instance, instead of being in the para position, it may be in the ortho or meta positions. Moreover, the organic groups positioned around the silicon atom may also be varied widely, in accordance with the various values for which R stands. R, of course, may be different organic values as, for instance, the monovalent hydrocarbon radicals around the silicon atom may consist of one methyl group and two ethyl groups, or one methyl group and two phenyl groups, etc. We do not intend to be limited to the type of organic group around the silicon atom, nor to the position on the benzene nucleus to which the silicon atom is attached.

In addition to the uses described above for the compositions herein disclosed and claimed, the triorganosilylphenylene phosphorus derivatives may also be condensed with aldehydes and used as modifying agents in the preparation of phenol-formaldehyde resinous compositions to impart plasticity to resins prepared from such mixtures.

What we claim as new and desire to secure by Letters Patent of the United States is:

1. A composition of matter comprising a triorganosilylphenylene derivative selected from the class consisting of (a) 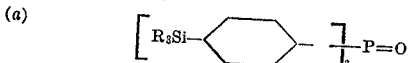

(b) 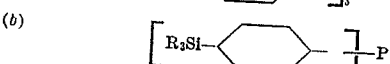

(c) 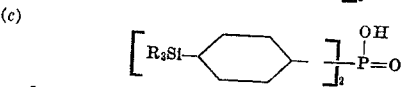

and (d) 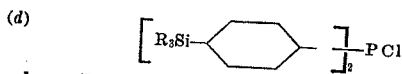

where R is a monovalent hydrocarbon radical.

2. Tris-(p-trimethylsilylphenylene) phosphine oxide having the formula

3. Bis-(p-trimethylsilylphenylene) phosphonic acid having the formula

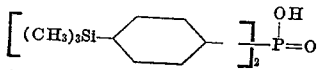

4. Tris-(p-trimethylsilylphenylene) phosphine having the formula

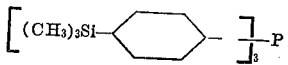

5. Bis-(p-trimethylsilylphenylene) chlorophosphine having the formula

KURT C. FRISCH.
HAROLD LYONS.

References Cited in the file of this patent

UNITED STATES PATENTS

| Number | Name | Date |
|---|---|---|
| 2,472,629 | Sprung | June 7, 1949 |
| 2,488,449 | Trautman | Nov. 15, 1949 |

OTHER REFERENCES

Sauer, "Jour. Am. Chem. Soc.," vol. 66 (1944), pages 1707–1710.

Malatesta, "Gazz. Chim. Ital." vol. 80 (1950), pages 527–532.